April 27, 1943.  G. A. BRACE  2,317,517

REFRIGERATION

Filed Feb. 5, 1940

INVENTOR
George A. Brace
BY
Harry S. Demarss
ATTORNEY

Patented Apr. 27, 1943

2,317,517

UNITED STATES PATENT OFFICE 2,317,517

REFRIGERATION

George A. Brace, Winnetka, Ill., assignor to The Hoover Company, North Canton, Ohio Application February 5, 1940, Serial No. 317,383

19 Claims. (Cl. 62—119.5)

This invention relates to refrigeration, and more particularly to a three-fluid absorption refrigerating apparatus having power means for circulating the mediums in the apparatus in which the rotor of the power unit is submerged in a liquid medium normally contained in the apparatus whereby it is unnecessary to provide special lubricants for the power unit.

In modern refrigeration apparatus having a power unit for circulating the mediums in the apparatus, the moving parts of the unit are sometimes sealed within the walls of the apparatus. It is therefore necessary to provide some means for lubricating the moving parts of the apparatus for long periods of time so as to avoid the necessity of frequent servicing.

In absorption refrigerating apparatus using ammonia as the refrigerant, the internal pressures are very high and as a consequence, the walls of the apparatus must be made of high strength steel usually welded together into an integral structure. It can thus be seen that to service the power unit of such a machine, it would be necessary to return the entire unit to the factory.

It is therefore an object of this invention to provide an absorption refrigerating apparatus, using ammonia as the refrigerant, and having the moving parts of the apparatus sealed within the integral walls of the system in which it will be unnecessary to service the power unit for long periods of time.

When a lubricant such as oil comes in contact with a refrigerating medium such as ammonia under pressure, some of the ammonia vapor is absorbed by the lubricant and when the pressure is released, this vapor expands, causing the lubricant to boil or foam. When the lubricant boils or foams, some of the lubricant will pass off with the escaping ammonia vapor.

In absorption refrigerating apparatus of the type using ammonia as the refrigerant, water as the absorbent, and a pressure equalizing medium, the total pressures within the system vary considerably between running and idle periods, depending upon the duration of the "on" and "off" periods and upon the amount of heat supplied to the boiler during "off" periods. Now, if oil is used as a lubricant for lubricating the moving parts of the apparatus, this variation in pressure will cause some boiling off of the ammonia vapor from the lubricant and eventually cause the lubricant to be dispersed to other parts of the apparatus unless some means is provided to prevent it.

It is therefore another object of this invention to provide an absorption refrigerating apparatus of the type using ammonia as a refrigerant and having internal pressure variations between running and idle periods, in which it is not necessary to provide oil as a lubricant for the moving parts of the power unit but in which the power unit is lubricated by a liquid medium normally contained in the apparatus.

Ammonia is readily soluble in water, can be readily separated therefrom by the application of heat and has a high heat of vaporization. It is therefore an excellent substance for use as a refrigerant in absorption refrigerating machines. It has, however, the disadvantage that it attacks iron or steel of which such machines are usually made. A corrosion inhibiter is therefore necessary to protect the metal of the boiler and solution circuit from attack by the ammonia. This inhibiter should be readily soluble in the absorbent and non-distillable so that it will not be boiled off with the refrigerant when the boiler is heated, so as to interfere with the operation of the machine.

One such corrosion inhibiter is sodium chromate dissolved in the solution. This has the property of reacting with the steel to form a stainless steel coating which is resistant to further attacks by the ammonia. This corrosion inhibiter, however, has the disadvantage that it attacks some other metals.

Aluminum is a good conductor of electricity and is also resistant to attack by ammonia, it is therefore a good material for the conductor bars and end rings of an induction rotor but it is very susceptible to attack by sodium chromate. Some bearing materials suitable for use in an ammonia atmosphere are also susceptible to attack by sodium chromate.

When a power unit is sealed in the interior of an absorption refrigerating apparatus using such an inhibiter, some means must be provided for preventing this sodium chromate from coming into contact with the power unit since it attacks the conductor bars, end rings and bearings of the power unit rotor.

It is therefore another object of this invention to provide an absorption refrigerating apparatus with a power unit sealed within the apparatus walls and using a corrosion inhibiter which is deleterious to the power unit, in which the power unit is protected from coming into contact with the inhibiter.

If the moving parts of the power unit are to be lubricated with the liquid mediums normally within the apparatus, some means must be provided to protect the moving parts of the power unit from the corrosion inhibiter. Now sodium chromate has the property that it is not driven off from the absorbent by the application of heat. It is therefore possible to collect a liquid medium from a part of the apparatus in which the liquid is free of the sodium chromate inhibiter provided it is collected from a part of the apparatus in which the liquid is condensed from a vapor. One such place for collecting liquid which is condensed from a vapor in an absorption refrigerating apparatus is from the rectifier.

It is therefore another object of this invention to provide an absorption refrigerating apparatus with a power unit within the system walls, the moving parts of which are lubricated with a liquid medium normally contained in the apparatus which is free of sodium chromate inhibiter, and more particularly in which the liquid medium is condensed from a vapor by being taken from the rectifier.

When the power unit of an absorption refrigerating apparatus is lubricated by a liquid medium, normally contained in the apparatus, such as condensed refrigerant, a solution of refrigerant or the absorbent, the heat of the motor will tend to evaporate the liquid slowly and where the power unit circulates the inert medium this vapor will inevitably find its way to the evaporator where it is undesirable.

If the liquid medium used is a strong solution, the refrigerant will evaporate first and the solution will become weaker. The rate of evaporation will decrease as this vapor is driven off since the water will not evaporate so quickly as the ammonia. It is therefore desirable to retain the original charge of the liquid medium in the power unit as long as possible and add only such additional liquid as is necessary so that the liquid medium which lubricates the power unit will eventually become almost pure water.

It is therefore another object of this invention to control the addition of a make up liquid so that the original charge will remain in the power unit as long as possible.

In absorption refrigerating apparatus of the type using a pressure equalizing medium, the pressures within the system are substantially equalized throughout all parts of the system.

It is therefore possible to circulate the mediums in the system with a very small power unit since there is very little pressure head to overcome. It has been found that small fractional horse power induction motors are suitable for this purpose. Since these motors are of very small size, the manufacturing tolerances are very small. It has been found that if the rotor of such a motor is submerged in a liquid that the rotor will tend to centralize itself during rotation and therefore the bearing clearances can be made much larger than would otherwise be possible. The submerging of the rotor in a liquid also results in a quieter running motor.

It is therefore an other object of this invention to circulate the mediums in an absorption refrigerating apparatus of the pressure equalizing type by means of a small induction motor in which the rotor thereof is submerged in a liquid medium normally contained within the apparatus.

Other objects and advantages of the invention will become apparent as the description proceeds when taken in connection with the accompanying drawing in which.

Figure 1:
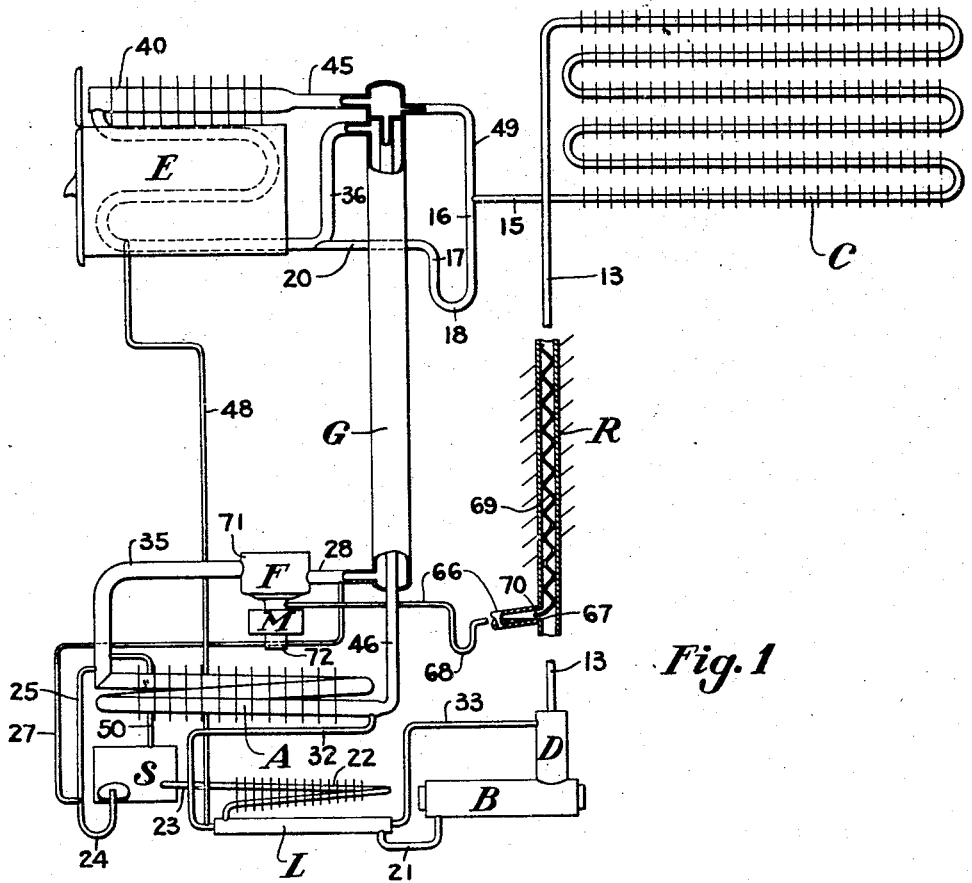
Figure 1 is a diagrammatical representation of an absorption refrigerating apparatus with this invention applied thereto.
Figure 2:
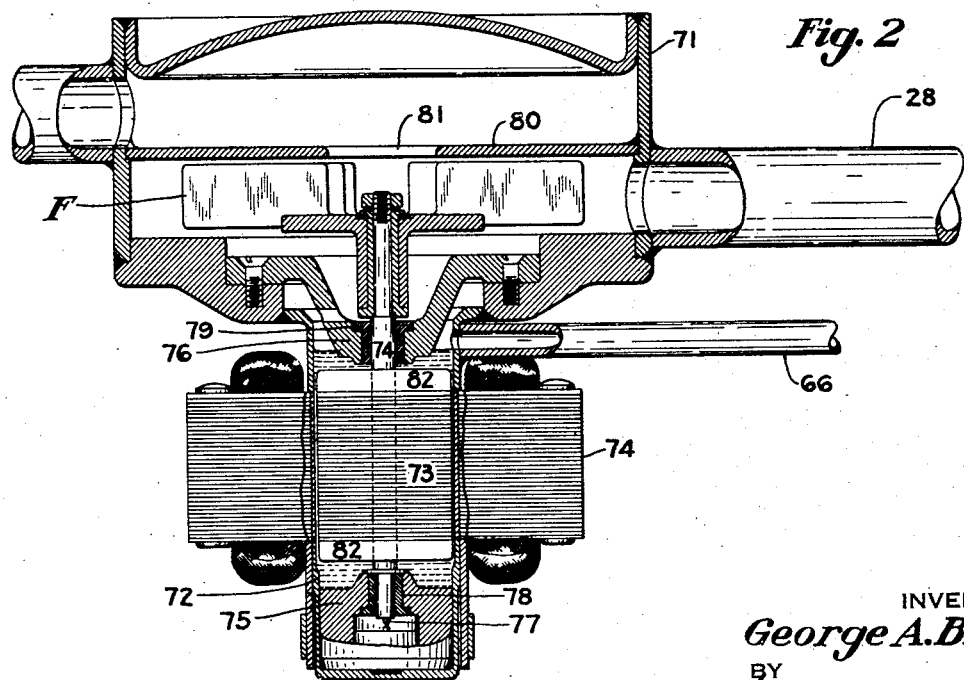
Figure 2 is a cross-sectional view of the power unit of this invention.

Referring to Figure 1 of the drawing, there is disclosed a three fluid absorption refrigerating system comprising a broiler B, an analyzer D, an air cooled rectifier R, a tubular air-cooled condenser C, an evaporator E, a gas heat exchanger G, a tubular air-cooled absorber A, a solution reservoir S, a liquid heat exchanger L, and a circulating fan F which is driven by an electric motor M.

The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water, with a corrosion inhibitor such as sodium chromate dissolved therein, and a suitable pressure equalizing medium, such as nitrogen.

The boiler B will be heated in any suitable manner, such as by an electrical heater or by any well known gas burner, as may be desired.

The application of heat to the boiler B liberates refrigerant vapor from the strong solution contained therein. The vapor so liberated passes upwardly through the analyzer D in counterflow relationship to strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air cooled rectifier R wherein any vapor of absorption solution passing through the analyzer is condensed and returned to the analyzer through the conduit 13.

The refrigerant vapor is liquefied in the condenser by heat exchange relation with atmospheric air and is discharged from the bottom portion thereof through a conduit 15 into a downwardly extending conduit 16. The bottom portion of the conduit 16 connects to the bottom portion of an upwardly extending conduit 17 through a U-bend 18. The conduit 16 is appreciably longer than the conduit 17 for a purpose to be described later. The conduit 17 opens at its upper end into a conduit 20 which discharges into the evaporator in a manner to be described more fully hereinafter.

The weak solution formed in the boiler by the generation of refrigerant vapor therefrom is conveyed from the boiler through a conduit 21, the outer pass of liquid heat exchanger L, through a pre-cooler 22 and a conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A. It is apparent that the top of the absorber is materially above the solution level normally presiding in the boiler-analyzer-reservoir system wherefore some means must be provided to elevate the absorption solution to the top of the absorber A. For this purpose a small bleed conduit 27 is connected to the discharge conduit 28 of the circulating fan F and leads to the junction of the conduits 24 and 25 which is below the solution level normally prevailing in the reservoir whereby the weak solution is elevated to the top of the absorber by gas lift action.

In the absorber, the weak solution flows downwardly by gravity in counterflow to the rich pressure equalizing medium refrigerant vapor mixture flowing upwardly therethrough. The refrigerant vapor content of the mixture is absorbed in the absorption solution and the heat of absorption is rejected to the surrounding air by air cooling fins which are mounted on the exterior walls of the absorber vessel. The strong solution formed in the absorber discharges into conduit 32 which opens into the inner pass of the liquid heat exchanger L. From the inner pass of the liquid heat exchanger L, the strong solution is conveyed to the upper portion of the paralyzer D by conduit 33 whereby it flows downwardly through the analyzer in counterflow to the rising vapors generated in the boiler.

The weak pressure equalizing medium refrigerant vapor mixture present in absorber A is taken from the upper portion thereof through the conduit 35 into the suction side of the circulating fan F in which it is placed under pressure and discharged through conduit 28 into the outer pass of the gas heat exchanger G and therefrom through a downwardly extending conduit 36 into the bottom of the evaporator E.

The conduit 20 opens into the bottom portion of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant with it through the evaporator into the box-cooling conduit 40 as the refrigerant is evaporated by diffusion into the pressure equalizing medium to produce refrigeration. In the conduit 40 the velocity of the inert gas stream is relatively slow by reason of the large diameter of that conduit and the liquid refrigerant flows therethrough by gravity. Any liquid refrigerant not evaporated in the evaporator will flow through conduit 45, the inner pass of the gas heat exchanger G and pass by conduit 46 to the bottom of the absorber so as not to interfere with the operation of the motor fan unit.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of absorber A through a conduit 46. In the absorber A the rich pressure equalizing medium refrigerant vapor mixture flows upwardly in counterflow to absorption solution whereby the refrigerant vapor content of the mixture is absorbed by the weak solution.

The bottom coil of evaporator E is provided with a drain conduit 48 which opens into the strong solution discharge conduit 32. The conduit 48 opens into the top portion of the bottom coil of the evaporator whereby it will not completely drain such conduit. The upper portion of discharge conduit 15 of the condenser is vented through a vent conduit 49 into the inner pass of the gas heat exchanger G. The solution reservoir is vented through a conduit 50 into the suction conduit 35 of the circulating fan.

The circulating fan F places the pressure equalizing medium discharged therefrom under a small pressure in the neighborhood of a pressure of a few inches of water over that prevailing at the suction side of the fan. In order to prevent this pressure, which also prevails in the conduit 36, from being carried back through the condenser discharge conduit, the condenser and conduit 13 to the analyzer, the conduit 16 is made appreciably longer than the conduit 17 whereby a pressure balancing column of liquid is formed in the conduit 16 which extends above the point of connection between the conduits 17 and 20 a distance sufficient to overcome the pressure produced by the circulating fan in the conduit 36.

The motor fan unit comprises a fan casing 71, and a cylindrical shell 72 welded thereto forming a housing for the fan F and the motor rotor 73. The motor rotor 73 is connected to the fan F by a shaft 74 which is suitably supported for rotation by bearing assemblies 75 and 76. The bearing assembly 75 includes a thrust bearing 77 of hard material which may be made of tungsten carbide and a large clearance radial babbit bearing 78. The bearing assembly 76 also includes a large clearance radial bearing 79.

The interior of the fan chamber is divided by a partition 80 into a suction chamber and a discharge chamber with an opening 81 leading to the suction eye of the fan.

A conduit 66 connects the lower part of the rectifier R to the interior of the shell 72 and has a U-shaped portion 68 for a purpose to be later described. The portion of the tube 66 between the U-shaped portion 68 and the rectifier has a downwardly sloping portion with an edge 67 on the interior edge of the rectifier tube. This edge is slightly below the point where the tube 66 enters the shell 72 of the motor for a purpose to be hereinafter described.

In the interior of the rectifier is a spiral baffle 69 in the form of a wire coil having its lower end portion 70 extending into the tube 66.

When the machine is in operation refrigerant vapor and some of the solution vapor will be boiled off in the boiler and rise through tube 13 into rectifier R. In the rectifier the vapor of the absorption solution and some of the ammonia vapor will be condensed and flow downwardly along the spiral coil 69. The surface tension of the liquid will cause it to follow the wire coil to its end portion 70 so that this liquid medium will be deposited in the end of the tube 66. This liquid medium will then flow through the tube 66 into the U-shaped portion 68.

Since the tube 66 opens into the interior of the shell 72, adjacent the suction side of the fan, the pressure in that end will be lower than the pressure in the rectifier. This pressure difference will cause the liquid in the U-shaped section 68 to flow upwardly through the longer leg thereof and into the shell 72. The point where the tube 66 enters the shell 72 should be above the edge 67 a height sufficient to overcome the difference in pressure in the rectifier and the interior of the shell 72. When the shell 72 is filled to the tube 66 the liquid column thus produced in the left hand leg of the U member 68 will counterbalance the difference in pressure between the motor shell and the rectifier.

After this time, no more fluid can flow into the shell 72 and the liquid thereafter condensed in the rectifier will flow over the edge 67 and back to the analyzer D in the usual manner. If some of the liquid in the shell 72 becomes dissipated, it will automatically be replaced by the liquid flowing to the tube 66 and the level in the shell 72 will be automatically maintained.

When the machine shuts down and the pressure in the shell 72 and that in the rectifier is equalized, the liquid in the shell 72 cannot flow back through tube 66 and over the shoulder 67 into the rectifier, but will be retained in the shell 72. Only that portion of the liquid which is in the long leg of the tube 66 will flow back into the rectifier and therefore the original charge of liquid medium will be maintained except that which evaporates from the shell 72.

The liquid medium discharged from the lower end of the rectifier is a mixture of absorption solution and refrigerant. The refrigerant being more volatile than the solution, will soon vaporize by the heat of the motor and almost pure solution will remain which will vaporize very slowly and therefore no undesirable vapor will be discharged from the fan into the evaporator.

Since the pressures within all parts of the system are substantially equalized, a very small motor fan unit can be utilized and it has been found that fractional horse power induction motors are suitable for this purpose. As is the usual procedure, the conductor bars and end rings 82 of the motor and the fan are made of aluminum to resist attack by the ammonia.

Since the sodium chromate corrosion inhibiter dissolved in the solution is not distillable and the liquid in the shell 72 is collected from the rectifier, the chromate can never reach the motor rotor to attack the aluminum therein.

If desired, a drain conduit can be provided sufficiently above the point of entrance of the tube 66 to drain away any liquid in the shell if the level should rise during some unusual operating condition.

By submerging the small induction motor of the type here used in a liquid medium, the clearance between the bearing surfaces and their shafts may be made much larger than would otherwise be possible since the action of the liquid automatically centers the rotor in its shell. This comes about by reason of the liquid tending to rotate with the rotor, and if the rotor is off center, the liquid will be pulled between the rotor and shell at the closest point until the rotor is exactly centered.

The buoyant effect of the liquid also relieves the load on the thrust bearing and thus diminishes the wear thereon. Since the rotating shaft is not in contact with the radial bearings except during the starting operation, there will be very little wear on them and the motor will operate indefinitely without attention and will operate in a much quieter manner.

As can be seen from the foregoing, this invention provides an absorption refrigerating apparatus of the pressure equalized type with power means for circulating the mediums in the apparatus which is sealed within the interior of the system, the moving parts of which are lubricated by a liquid medium normally contained in the system which is free of the sodium chromate inhibiter in the solution circuit and in which the level of the liquid medium in the power unit is automatically maintained at the correct level by adding make-up liquid only when necessary.

While I have shown but a single embodiment of my invention, it is to be understood that this embodiment is taken as illustrative only and not in a limiting sense. I do not wish to be limited to the specific structure shown and described but to include all equivalent variations thereof except as limited by the claims.

I claim:

1. An absorption refrigerating apparatus comprising a boiler, a rectifier, a motor fan unit for circulating the mediums in the apparatus and a conduit connecting the bottom of the rectifier with the motor fan unit, said motor fan unit being so positioned relative to the rectifier that distillate from the rectifier flows through said conduit to the motor fan unit to lubricate the same.

2. An absorption refrigerating apparatus comprising a boiler, a rectifier, a motor fan unit for circulating mediums in the apparatus, a conduit connecting the bottom of the rectifier with the motor fan unit, said apparatus being charged with a refrigerant, an inert pressure equalizing medium, an absorption solution and a non-distillable corrosion inhibitor dissolved in said absorption solution, said motor fan unit being so positioned relative to the rectifier that distillate from the rectifier flows through said conduit to the motor fan unit and the motor fan unit is lubricated with distillate free of the corrosion inhibiter.

3. An absorption refrigeraitng apparatus comprising a boiler, a rectifier, a motor fan unit for circulating the mediums in the apparatus, a conduit connecting the bottom of the rectifier with the motor fan unit, said motor fan unit being so positioned relative to the rectifier that distillate from the rectifier flows through said conduit to the motor fan unit to lubricate the same and means dependent upon the amount of condensate in the motor fan unit for limiting the flow of distillate to said motor fan unit.

4. An absorption refrigerating apparatus, a power unit within the apparatus for circulating the mediums in the apparatus, means for lubricating the power unit with a liquid medium normally contained in the apparatus while remaining in the apparatus, and means dependent upon the amount of liquid medium in the power unit for limiting the flow of liquid medium to said power unit.

5. An absorption refrigerating apparatus comprising a boiler, a rectifier, a motor fan medium circulator unit, said motor fan unit comprising a vertically extending casing for housing a motor rotor and fan and a conduit connecting the bottom of the rectifier with said casing, said casing being so positioned relative to said rectifier that distillate from the rectifier flows through said conduit to the casing so that the motor rotor is submerged in said distillate.

6. An absorption refrigerating apparatus comprising a boiler, a rectifier, a motor fan medium circulator unit, said motor fan unit comprising a vertically extending casing for housing a motor rotor and fan, a conduit connecting the bottom of the rectifier with said casing, said casing being so related to said rectifier that distillate from the rectifier flows through said conduit to the casing so that the motor rotor is submerged in said distillate and means dependent upon the amount of condensate in said casing for limiting the flow of distillate to said casing.

7. An absorption refrigerating apparatus, a power operated medium circulator unit in the apparatus, said apparatus being charged with a refrigerant and an absorbent having a substance dissolved therein which is deleterious to said power unit, means for lubricating said power unit with a liquid medium with which the apparatus is charged while remaining within the apparatus, said means being so constructed as to supply a distillate to said power unit whereby the deleterious substance cannot come into contact with the power unit, said means being dependent upon the amount of liquid medium in the power unit for governing the flow of liquid medium to said power unit.

8. An absorption refrigerating apparatus including a rectifier and a power operated medium circulator unit and means for leading distillate from said rectifier to said power unit.

9. An absorption refrigerating apparatus including a rectifier and a motor fan medium circulator unit, said motor fan unit comprising a vertical casing for housing a motor rotor and fan and means for leading distillate from said rectifier to said casing so that the motor rotor is submerged in distillate.

10. An absorption refrigerating apparatus including a rectifier and a power operated medium circulator unit, means for leading distillate from said rectifier to said power unit, and means depending upon the amount of distillate in said power unit for limiting the flow of distillate to said power unit.

11. An absorption refrigerating apparatus including a rectifier and a motor fan medium circulator unit, said motor fan unit comprising a vertical casing for housing a motor rotor and fan, means for leading distillate from the rectifier to said casing so that the motor rotor is submerged in distillate and means dependent upon the amount of condensate in said casing for limiting the flow of distillate to said casing.

12. An absorption refrigerating apparatus including a rectifier and a power operated medium circulator unit, said rectifier including an interior spiral baffle, a conduit leading from said rectifier to said power unit, said baffle being so constructed as to lead distillate from said rectifier to said conduit.

13. An absorption refrigerating apparatus including a rectifier, a power operated medium circulator unit, a conduit leading from said rectifier to said power unit, said rectifier including an interior spiral baffle, said baffle being so constructed as to lead distillate from said rectifier to said conduit whereby said power unit may be supplied with distillate from said rectifier and means dependent upon the amount of distillate in said power unit for governing the flow of distillate to said power unit.

14. The method of lubricating the power unit of an absorption refrigerating apparatus of the type having a rectifier comprising the step of leading distillate from the rectifier to the power unit.

15. The method of operating absorption refrigerating apparatus of the type having a power operated medium circulator unit and a non-distillable corrosion inhibiter dissolved in an absorbent comprising heating the absorbent to distill off vapor, rectifying the vapor and leading the distillate thus formed to the power unit.

16. The method of operating an absorption refrigerating apparatus of the type having a power operated medium circulator unit and a non-distillable corrosion inhibitor dissolved in an absorbent comprising heating the absorbent to distill off vapor free of the corrosion inhibitor, rectifying the vapor, leading distillate thus formed to the power unit and controlling the flow of distillate to the power unit responsive to the amount of distillate present in the power unit.

17. The method of operating an absorption refrigerating apparatus of the type having a power operated medium circulator unit and a non-distillable corrosion inhibitor dissolved in an absorbent comprising heating the absorbent to drive off a vapor free of the corrosion inhibiter, rectifying the vapor, leading a portion of the distillate thus formed to the power unit and supplying make-up distillate to said power unit as the distillate therein is dissipated.

18. An absorption refrigerating apparatus including a rectifier and a power operated medium circulator unit, a conduit for leading distillate from said rectifier to said power unit, said conduit being so constructed as to lead distillate back into said rectifier when sufficient distillate has been supplied to said power unit and to supply make-up distillate to said power unit as the distillate therein dissipates.

19. An absorption refrigerating apparatus including a rectifier and power operated medium circulator unit, a conduit for leading a portion of the distillate from said rectifier to said power unit, said conduit being so constructed as to supply make-up distillate to said power unit as the distillate therein dissipates.

GEO. A. BRACE.